United States Patent

Usamoto et al.

[11] 4,048,275
[45] Sept. 13, 1977

[54] CROSS-LINKING AND FOAMING INJECTION MOLDING PROCESS FOR ETHYLENIC POLYMERS

[75] Inventors: Teruyoshi Usamoto, Higashi Osaka; Kenji Miyawaki, Ibaraki; Toshiaki Shiota, Takatsuki; Hideki Takeuchi, Toyonaka; Yoshio Tadokoro, Ibaraki, all of Japan

[73] Assignee: Sumitomo Chemical Company, Limited, Osaka, Japan

[21] Appl. No.: 627,409

[22] Filed: Oct. 30, 1975

[30] Foreign Application Priority Data

Oct. 30, 1974 Japan .................. 49-125916

[51] Int. Cl.² .................. B29D 27/00; B29F 1/08
[52] U.S. Cl. .................. 264/54; 264/329; 264/DIG. 5; 264/DIG. 18; 264/DIG. 83
[58] Field of Search ........ 264/54, DIG. 18, DIG. 83, 264/DIG. 14, 329, DIG. 5; 259/191

[56] References Cited

U.S. PATENT DOCUMENTS

| | | | |
|---|---|---|---|
| 2,530,289 | 11/1950 | Cook | 264/54 |
| 3,098,832 | 7/1963 | Pooley et al. | 264/DIG. 18 |
| 3,376,238 | 4/1968 | Gregorian et al. | 264/DIG. 18 |
| 3,608,145 | 9/1971 | Baker et al. | 264/DIG. 14 |
| 3,776,989 | 12/1973 | Annis et al. | 264/DIG. 83 |
| 3,878,285 | 4/1975 | Souffie | 264/329 |
| 3,923,922 | 12/1975 | Grant | 264/DIG. 83 |
| 3,937,447 | 2/1976 | Alwes et al. | 259/191 |

FOREIGN PATENT DOCUMENTS

696,222  10/1964  Canada .................. 264/DIG. 18

OTHER PUBLICATIONS

Menges, Prof. G. and W. Elbe, "Injection Machine Design in the 1980's," in *Plastics and Polymers*, June 1972, pp. 153-157.

*Primary Examiner*—Philip Anderson
*Attorney, Agent, or Firm*—Sughrue, Rothwell, Mion, Zinn and Macpeak

[57] ABSTRACT

An injection molding process for forming cross-linked, foamed moldings of an ethylenic polymer by passing a molding composition comprising an ethylenic polymer/cross-linking agent/foaming agent blend through the cylinder of an injection molding machine without substantially decomposing the cross-linking agent and the foaming agent, introducing the molding composition into a molding composition holding chamber provided at the exit end of the cylinder of the injection molding machine to decompose the cross-linking agent and the foaming agent therein, and injecting the molding composition into a mold.

The invention also provides apparatus for carrying out the process comprising an injection molding cylinder for conveying and plasticizing the molding composition and a molding composition holding chamber provided at the exit end of the cylinder.

8 Claims, 16 Drawing Figures

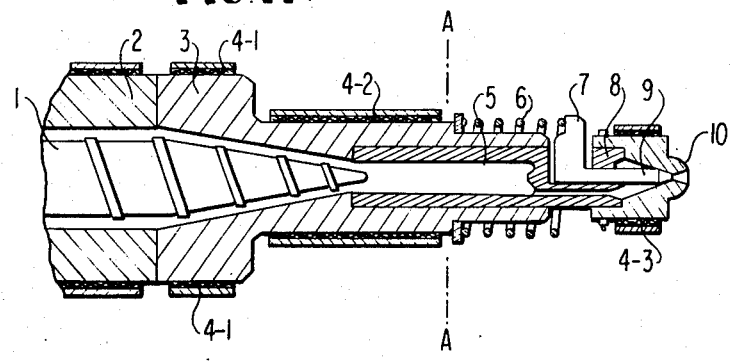
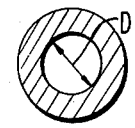
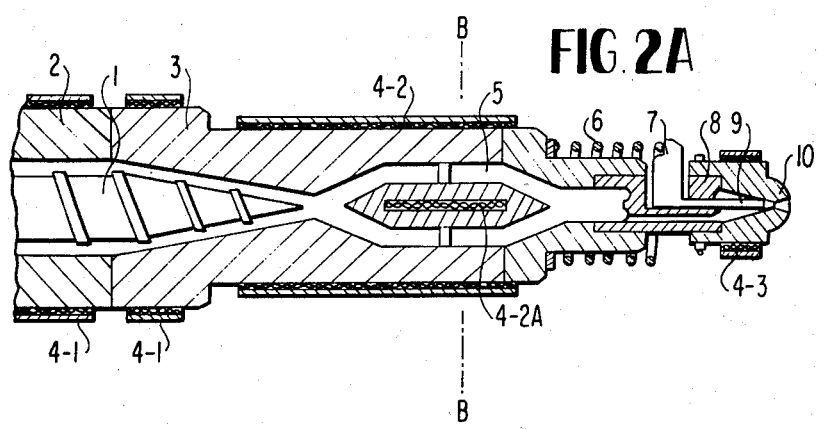
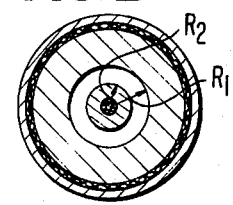
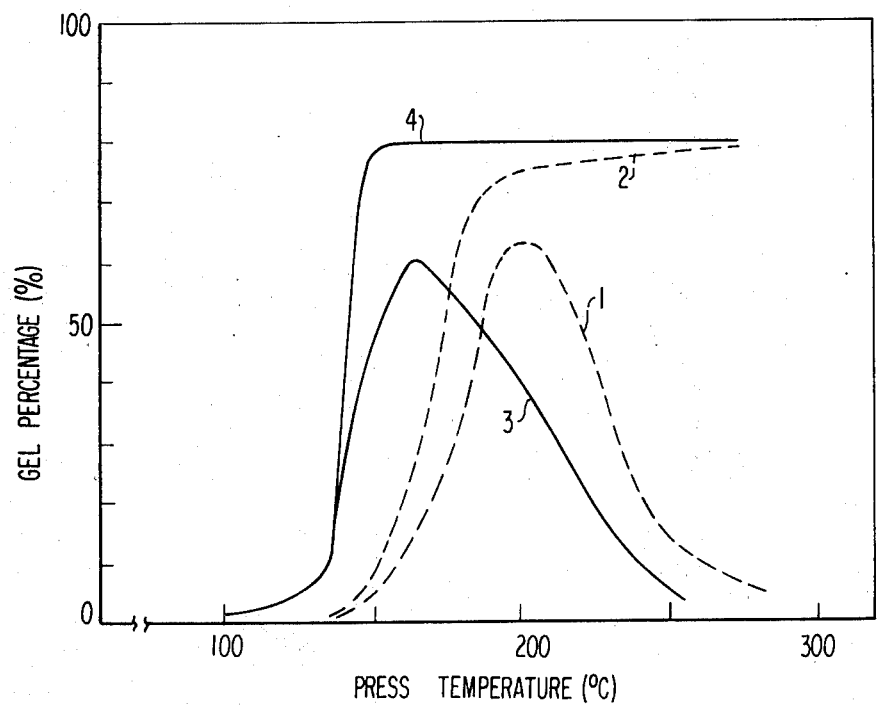

(HOLLOW TYPE)

(HOLLOW TYPE)

(ANNULAR TYPE)

(ANNULAR TYPE)

(ANNULAR TYPE)

CROSS-LINKING AND FOAMING INJECTION MOLDING PROCESS FOR ETHYLENIC POLYMERS

BACKGROUND OF THE INVENTION

1. FIELD OF THE INVENTION

The present invention relates to a process of forming cross-linked, foamed moldings of an ethylenic polymer by cross-linking and foaming an ethylenic polymer in a molding composition holding chamber provided at the exit end of the cylinder of an injection molding machine and then injecting the molding composition into a mold.

DESCRIPTION OF THE PRIOR ART

Hitherto, as processes of forming cross-linked, foamed moldings of an ethylenic polymer, press molding has generally been employed, but since press molding requires the steps of cutting and drawing the moldings, press molding is usually accompanied by low yields and high costs.

Recently, injection molding using an open (free) foaming system has been practiced, but moldings formed by such a process are poor in dimensional accuracy and thus do not meet market requirements, i.e., since polymer is injected into a heated mold to effect cross-linking and foaming simultaneously with mold opening, the dimensional accuracy of the products is poor and, in particular, in the case of producing thick articles of complex shapes, it is difficult to continuously obtain products with good reproducibility.

There is also known a process which comprises cross-linking and foaming using a conventional injection molding machine while maintaining the temperature of the cylinder thereof above the decomposition temperatures of the crosslinking agent and foaming agent, but in such a process excessive localized cross-linking often occurs due to localized retention of polymer in the cylinder, and further cross-linking proceeds in a heterogeneous fashion in the channel of the screw, which makes it difficult to perform continuous molding.

SUMMARY OF THE INVENTION

As the result of various investigations to overcome the aforesaid faults, the inventors succeeded in reaching the present invention.

One object of this invention is, therefore, to provide a process of continuously forming cross-linked, foamed moldings of an ethylenic polymer of high dimensional accuracy and high reproducibility at good yields and at low cost, which can be carried out by injecting a cross-linked, foamed ethylenic polymer containing molding composition into a cool mold as in conventional injection molding.

Another object of this invention is to provide an injection molding process for forming homogeneous cross-linked, foamed moldings of an ethylenic polymer possessing excellent abrasion resistance.

The aforesaid objects are attained according to the present invention which provides an injection molding process for forming cross-linked, foamed moldings of an ethylenic polymer which comprises passing an ethylenic polymer/crosslinking agent/foaming agent molding composition through the cylinder of an injection molding machine without substantially decomposing the cross-linking agent and the foaming agent therein, introducing the molding composition into a molding composition holding chamber provided at the exit end of the cylinder, wherein the molding composition is retained to decompose the cross-linking agent and the foaming agent, and then injecting the molding composition in a mold.

According to another embodiment of this invention, there is provided an injection molding process for forming cross-linked, foamed moldings of an ethylenic polymer which comprises passing an ethylenic polymer/cross-linking agent/foaming agent molding composition through the cylinder of an injection molding machine, the temperature of the cylinder being kept at a temperature below the temperature which is the sum of the one minute half-life temperature of the crosslinking agent plus 20° C, introducing the molding composition into a molding composition holding chamber provided at the exit end of the cylinder, the temperature of the molding composition holding chamber being kept above the temperature of the cylinder and below the temperature which is the sum of the one minute half-life temperature of the cross-linking agent plus 70° C, to decompose the cross-linking agent and the foaming agent, and then injecting the molding composition into a mold.

Moreover, according to another embodiment of this invention, there is utilized an injection molding apparatus for forming cross-linked, foamed moldings of an ethylenic polymer comprising a cylinder for passing an ethylenic polymer/cross-linking agent/foaming agent molding composition, without substantially decomposing the cross-linking agent and the foaming agent, and a molding composition holding chamber provided at the exit end of the cylinder as a reaction chamber for decomposing the cross-linking agent and the foaming agent in the molding composition. The molding composition holding chamber has a volume capable of containing at least substantially the same amount of the molding composition as is required to form the desired amount of product, and the greatest value of the shortest distance from any point in a cross section of the molding composition holding chamber containing the molding composition to a heat conductor in the molding composition holding chamber is shorter than 25 mm when the molding composition holding chamber is hollow, and is shorter than 15 mm when the molding composition holding chamber is annular.

BRIEF DESCRIPTION OF THE DRAWINGS

FIG. 1A is a sectional side view of one embodiment of a cylinder head of an injection molding machine having a molding composition holding chamber at the exit end of the cylinder suitable for the practice of this invention, and FIG. 1B is a cross sectional view taken on line A—A of FIG. 1A.

FIG. 2A is a sectional side view of another embodiment of a cylinder head of an injection molding machine having a molding composition holding chamber at the exit end of the cylinder suitable for the practice of this invention, and FIG. 2B is a cross sectional view taken on line B—B of FIG. 2A.

FIG. 10 illustrates the results of measuring the gel percentages of various pressed cross-linked, foamed sheets.

DESCRIPTION OF THE PREFERRED EMBODIMENTS

Figure 3A:
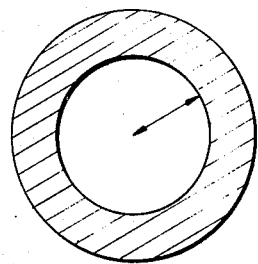
FIGS. 3A to 3E show schematical cross sectional views of several embodiments of a molding composition holding chamber.
Figure 3B:
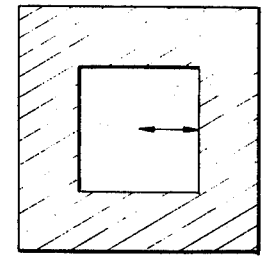
Figure 3C:
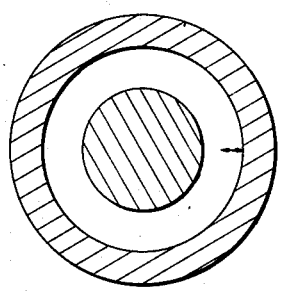
Figure 3D:
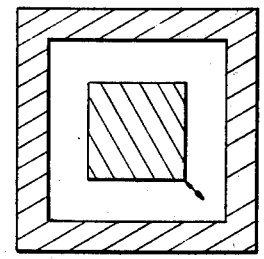
Figure 3E:
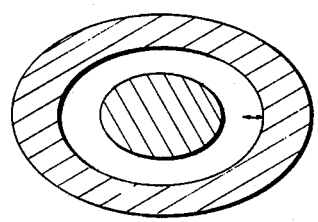

The molding composition used in this invention is usually a mixture of 100 parts by weight of ethylenic polymer, 0.05 to 30 parts by weight, preferably 0.1 to 15 parts by weight, of a foaming agent and 0.05 to 10 parts by weight, preferably 0.1 to 5.0 parts by weight, of a cross-linking agent. Furthermore, a molding composition suitable for forming cross-linked, foamed moldings possessing excellent abrasion resistance is a mixture of 100 parts by weight of ethylenic polymer, 1.0 to 15 parts by weight of a foaming agent, and 0.2 to 3.0 parts by weight of a cross-linking agent. If desired, an inorganic filler such as asbestos, talc, calcium carbonate, etc.; a lubricant such as zinc stearate, stearic acid, etc.; and a pigment may be incorporated in the molding composition.

In order to simultaneously carry out foaming and cross-linking of the molding composition in the molding composition holding chamber and to further carry out continuous injection molding in the present invention, it is necessary that the decomposition temperature of the foaming agent and cross-linking agent be higher than the plasticizing temperature of the ethylenic polymer employed. Further, if the temperature difference between the decomposition temperature of the foaming agent (temperature at which the foaming agent generates a foaming gas by the thermal decomposition thereof) and the decomposition temperature (one minute half-life temperature) of the cross-linking agent for forming radicals necessary for initiating cross-linking reaction is too large, the faults occur that the molding composition in the holding chamber loses fluidity due to non-foaming and excessive cross-linkage or cross-linking becomes insufficient, which sometimes makes it difficult to obtain satisfactory, homogeneous cross-linked, foamed moldings. Thus, it is necessary that the decomposition temperature of the foaming agent used not differ too much from the decomposition temperature (one minute half-life temperature) of the cross-linking agent used, or the temperature difference between both decomposition temperatures be at most 20° C.

The decomposition temperature of the foaming agent can be reduced using a foaming aid, and in the case of using such a foaming aid, the decomposition temperature means the thus obtained reduced decomposition temperature.

The term "ethylenic polymer" used throughout the specification and claims includes homopolymers of ethylene such as high-pressure polyethylene, intermediate-pressure polyethylene and low-pressure polyethylene; copolymers of ethylene and one or more comonomers such as vinyl acetate, propylene, acrylic acid, acrylic acid esters, etc.; mixtures of two or more of such polymers; and mixtures of the aforesaid polymers and other polymers miscible with the aforesaid polymers, such as natural rubber, ethylene-propylene rubber, styrene-butadiene copolymer, polybutene-1, butyl rubber, polyisobutylene, polystyrene, ABS rubber, etc. Ethylene-vinyl acetate copolymers are most preferable.

Examples of the foaming agents used are azodicarbonamide, p-toluenesulfonyl hydrazide, azobisisobutyronitrile, dinitrosopentamethylene tetramine, etc., all of which have a decomposition temperature higher than the plasticizing temperature of the ethylenic polymer.

Examples of the cross-linking agents used are 1,3-di-(t-butyl-peroxy-isopropyl)benzene, benzoyl peroxide, dicumyl peroxide, 1,1-di-t-butyl-peroxy-3,3,5-trimethyl-cyclohexane, etc., all of which have a decomposition temperature higher than the plasticizing temperature of the ethylenic polymer.

The molding composition can be prepared by any mixing method, but it is necessary to mix at temperatures which do not cause decomposition of the cross-linking agent and the foaming agent. Mixing in a Henschel mixer, a tumbler mixer, etc., may be used. Also, for kneading the molding composition, a Banbury mixer, a roll, a granulator, etc., can be used.

An example of the present invention will now be given by referring to the accompanying drawings.

FIG. 1A shows a sectional side view of one embodiment of a cylinder head having a molding composition holding chamber provided at the exit end of the cylinder of an injection molding machine suitable for the practice of this invention.

A molding composition comprising an ethylenic polymer, a foaming agent, a cross-linking agent, and, if desired, other additives is fused, kneaded, and passed by means of screw 1 for plasticization and injection through the area of cylinder 2 (heated by heater 4-1 to a temperature which is higher than the plasticization temperature of the ethylenic polymer but lower than the temperature which would cause substantial decomposition of the foaming agent and cross-linking agent), and then introduced into a molding composition holding chamber 5 formed at the exit end of cylinder head 3. The molding composition holding chamber can be of the known accumulator type. The molding composition thus plasticized and introduced into the molding composition holding chamber 5 is heated therein to the proper temperature and retained therein for a proper residence time at a temperature suitable to cause foaming and cross-linking in the molding composition holding chamber (which essentially functions as a reaction chamber until the molding composition is injected from injection nozzle 10. The molding composition thus provided with the proper degree of cross-linking in the molding composition holding chamber is injected into a mold, wherein the molding composition is shaped and solidified by cooling in situ.

The injection of the molding composition is carried out by moving spring bearing 7 to the left as shown in FIG. 1A and sliding needle 9 in a valve housing 8 to the left as shown in FIG. 1A. After the injection is completed, needle 9 moves to the right as shown in FIG. 1A, due to the action of spring 6, to close nozzle 10. The expansion ratio of the molding composition can be adjusted by controlling the amount of the molding composition fed to the mold.

In FIG. 1A elements 4-2 and 4-3 represent heating means for the molding composition holding chamber and the injection nozzle, respectively. As will be appreciated from later discussion, the heating means 4-2 serves to heat the molding composition holding chamber, the walls of which can be considered "heat conductors" for purposes of determining the maximum cross-sectional length of the molding composition holding chamber.

FIGS. 2A and 2B show a further embodiment of apparatus for use in practicing the present invention wherein like numerals to those utilized in FIGS. 1A and 1B are used. The only difference of substance between FIGS. 1A and 1B and FIGS. 2A and 2B is that an annular molding composition holding chamber is utilized in FIGS. 2A and 2B, with a centrally disposed heated conductor 4-2A also being shown, wherein the inner radius of the annulus is shown as $R_2$ in FIG. 2B and the outer radius of the annulus is shown as $R_1$ in FIG. 2B.

In the present specification, it will be appreciated by one skilled in the art that the cylinder portion of the injection molding machine represents that portion prior to the molding composition holding chamber.

The examples shown below illustrate in detail the process of this invention for forming homogeneous cross-linked, foamed moldings of ethylenic polymer having excellent abrasion resistance.

As shown in Example 1, it is necessary with a molding composition comprising an ethylene-vinyl acetate copolymer as the ethylenic polymer, 1,3-bis-(t-butyl-peroxyisopropyl)benzene as the cross-linking agent, and azodicarbonamide as the foaming agent, that the temperature of the cylinder portion (pre-holding chamber area) be kept below 200° C (the one minute half-life temperature of the cross-linking agent plus 20° C) and the highest temperature of the molding composition holding chamber be kept at 250° C (the one minute half-life temperature of the cross-linking agent plus 70° C) to increase the gel percentage of the molded article to higher than 30%.

Figure 8:
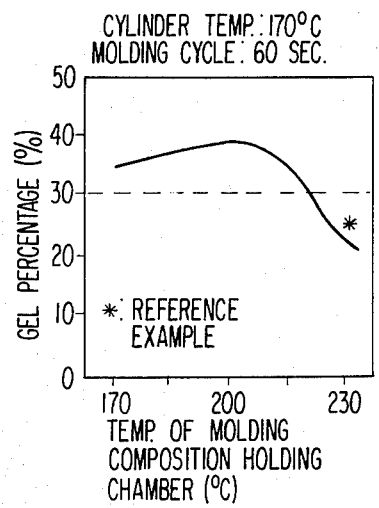

Furthermore, as shown in Example 2, it is necessary with a molding composition comprising an ethylene-vinyl acetate copolymer as the ethylenic polymer, 1,1-di-t-butyl-peroxy-3,3,5-trimethyl cyclohexane as the cross-linking agent, and azodicarbonamide as the foaming agent, the temperature of the cylinder portion (pre-holding chamber area) be kept below 170° C (the one minute half-life temperature of the cross-linking agent plus 20° C) and the highest temperature of the molding composition holding chamber be kept at 220° C (the one minute halflife temperature of the cross-linking temperature plus 70° C) in order to increase the gel percentage of the molded article to higher than 30% but less than about 40% as particularly shown in FIG. 8 and Example 2.

In addition, it should be understood that the lowest temperature of the molding composition holding chamber is the temperature of the cylinder portion, i.e., that portion of the apparatus prior to the molding composition holding chamber.

When the temperatures of the cylinder portion and the molding composition holding chamber are too high, the gel percentage of the molded articles is reduced because the radicals generated by the decomposition of the cross-linking agent are disturbed by the foaming agent or the decomposition product of the foaming agent. This is supported by the results shown in the reference example described below, where with a molding composition containing no foaming agent no trouble occurred with the cross-linking reaction even when the temperature of the molding composition was increased to a temperature of 100° C higher than the one minute half-life temperature of the cross-linking agent in the molding composition.

Also, by referring to the results in the reference example where cross-linking was hindered by the foaming agent or the decomposition product of the foaming agent, it is clear that the above rules hold with ethylenic polymers other tha those illustrated in the examples, and thus the invention is not to be limited to the examples.

If the gel percentage of the cross-linked, foamed moldings is lower than 30%, the molded articles show insufficient abrasion resistance, i.e., to obtain cross-linked, foamed moldings having excellent abrasion resistance, it is necessary that the gel percentage of the moldings be higher than 30%. The term "gel percentage" in this specification is defined as follows:

When 0.3 - 0.4 g of a sample from a cross-linked, foamed molding is placed in a metallic screen box (120 mesh) in xylene at 80° C, the gel percentage of the sample is calculated as follows:

Gel percentage = (A)/(B) × 100 (%)

wherein (A) is the weight of the sample remaining in the metal screen box after the test and (B) is the weight of the sample before the test.

One embodiment of apparatus in accordance with the present invention for forming cross-linked, foamed moldings of excellent abrasion resistance will now be explained in detail.

It is necessary that the molding composition holding chamber of the injection molding machine of this invention has a capacity sufficient to contain at least the amount of molding composition needed to form one molded article, i.e., sufficient to complete one injection molding cycle, and, for commercial scale operation, the capacity of the molding composition holding chamber is greater than the amount of the molding composition injected into the mold for forming one molded article. If the capacity of the molding composition holding chamber is less than the amount of the molding composition injected into the mold to form one molded article, a part of the molding composition injected into the mold will not have been retained in the molding composition holding chamber for a sufficient time. In such a case, cross-linking and foaming do not occur uniformly and, since the foaming agent remains partially unreacted, the remaining foaming agent colors the molded article. Thus, as described above, the capacity of the molding composition holding chamber of the injection molding machine of this invention must be at least equal to and can be larger than the volume of the molding composition injected into the mold to form one article.

If the capacity of the molding composition holding chamber is larger than the volume of the molding composition to be injected into the mold, some of the molding composition introduced into the molding composition holding chamber may remain therein without being injected into the mold in the first injection step, but since the temperature of the molding composition holding chamber is selected according to the residence time of the molding composition in the holding chamber, good molded articles can be continuously formed even in such a case.

As shown in Example 3, when the molding cycle (i.e., the residence time of the molding composition in the holding chamber) is one minute, it is necessary, to obtain uniform foamed molded articles which have been cross-linked at a gel percentage of higher than 30%, to employ a molding composition holding chamber having a cross section of less than 50 mm (inner diameter) in the case that the cross section of the molding composition holding chamber is circular and to employ a molding composition holding chamber having a cross section of $(R_1 - R_2) \leq 30$ mm $(R_1 \geq \frac{1}{2} \cdot R_2)$ wherein $R_1$ is the outer radius of the annular holding chamber and $R_2$ is inner radius of the annular holding chamber, in the case that the molding composition holding chamber is annular, as shown in Example 3, if the shape of the molding composition holding chamber differs from the aforesaid shape unfoamed portions of the molded articles can be foamed completely using a one minute molding cycle by increasing the temperature of the molding composition holding chamber, but in this case the gel percentage of the molded articles formed is low, and thus the products which have been cross-linked to a gel percentage of higher than 30% and uniformly foamed cannot be obtained.

It should be understood that the above parameters are also applicable to the molding composition holding chambers having forms other than those illustrated above, i.e., to obtain molded articles which are cross-linked to a gel percentage of higher than 30% and uniformly foamed it is only necessary to use a holding chamber for the molding composition which has a hollow form in which the greatest value of the shortest distance from any point in a cross-section of the molding composition holding chamber to a heat conductor is less than 25 mm or to use a holding chamber for the molding composition having an annular form in which the greatest value of the shortest distance from any point in a cross-section of the molding composition holding chamber to a heat conductor is less than 15 mm.

Several examples of cross sectional views of hollow and annular molding composition holding chambers which can be employed in this invention are illustrated in FIGS. 3A to 3E, although the molding composition holding chambers are not to be limited thereto. The heat conductor is shown by the shaded portions in FIGS. 3A to 3E. In each figure of FIGS. 3A to 3E, the greatest value of the shortest distance from any point in the molding composition holding chamber to a heat conductor in the cross section is shown by an arrow.

The above-described results are those obtained when the molding cycle is one minute on an industrial scale; a molding cycle of one minute is considered to be the longest desirable commercial molding cycle, as if the molding cycle is longer than one minute, the time required for the formation of the moldings becomes undesirably high from a cost (output) viewpoint, and thus, the aforesaid results apply to the commercial use of this invention.

In Example 3 a molding composition consisting of an ethylene-vinyl acetate copolymer as the ethylenic polymer, 1,3-bis-(t-butyl-peroxy-isopropyl)benzene as the cross-linking agent, and azodicarbonamide as the foaming agent was used. Since the decomposition temperature of the cross-linking agent is near that of the foaming agent, other molding compositions than the above, consisting of combinations or other cross-linking agents and foaming agents with an ethylenic polymer can be used, the decomposition temperatures of the agents are higher than the plasticization temperature of the ethylenic polymer, may be molded as in Example 3 by only changing parallelly the temperature of the cylinder and the molding composition holding chamber of the injection molding machine as degree as the difference between the decomposition temperature of the crosslinking agent of this molding composition and that of the molding composition in Example 3. That is, the molding composition in this invention is not limited to the system of the ethylenic polymer, the cross-linking agent, and the foaming agent as described in Example 3.

The process and the apparatus of this invention have the following merits:

1. Since foaming and cross-linking of the molding composition are carried out in the molding composition holding chamber and then the molding composition is injected followed by solidification by cooling, the dimensional accuracy and reproducibility are high for both low foaming ratio moldings and high foaming ratio moldings.

2. Since foaming and cross-linking are carried out simultaneously and continuously in a molding composition holding chamber and then the cross-linked, foamed composition is cooled immediately in a mold, the molding production rate is shortened, which is quite profitable from the viewpoint of cost.

3. Uniformly cross-linked, foamed moldings having excellent abrasion resistance and a cross-linkage of higher than 30% (gel percentage) can be obtained in a continuous fashion.

The invention will now be further illustrated by the following examples.

EXAMPLE 1

A mixture of 100 parts by weight of an ethylene-vinyl acetate copolymer (melt index, 20 dg/min; vinyl acetate content, 20% by weight), 5 parts by weight of azodicarbonamide as the foaming agent (decomposition temperature 200° C; when 2 parts by weight of zinc stearate is added thereto, the decomposition temperature is reduced to about 180° C), 0.6 part by weight of 1,3-bis-(t-butyl-peroxy-isopropyl)benzene (one minute half-life temperature 180° C; purity 40%) as the cross-linking agent, 20 parts by weight of calcium carbonate as a filler and 2 parts by weight of zinc stearate as a foaming aid agent was kneaded on a 16 inch roll for 15 minutes at a temperature of 90° C to provide a molding composition.

Figure 4:
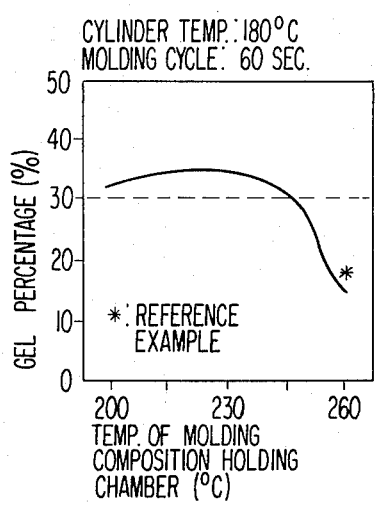
FIGS. 4 to 9 illustrate the relationship between molding conditions and the gel percentages of the resultant moldings.
Figure 5:
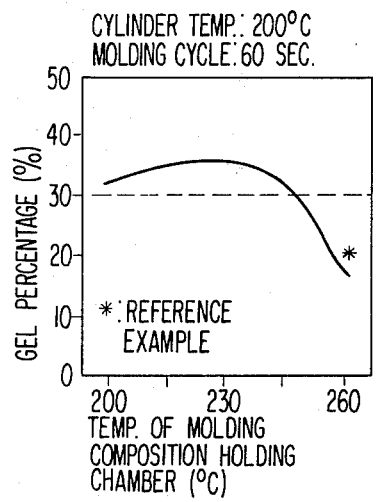
Figure 6:
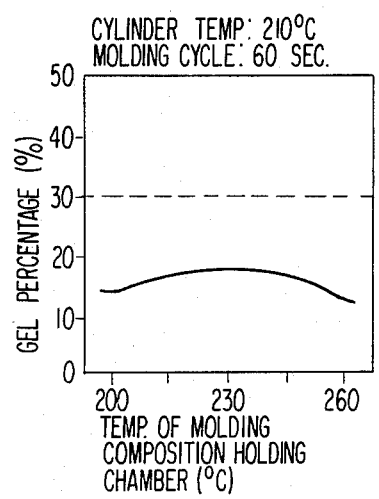

The molding composition thus prepared was injected into a mold for shoe soles having a volume of 600 cc using the apparatus shown in FIG. 1 (the volume of the molding composition holding chamber was 300 cc and the inner diameter of the holding chamber was 40 mm), and a cross-linked, foamed molding having a gel percentage of more than 30% was obtained. The foaming ratio of the product was 2.0 – 2.2 times. The relations between various moldings prepared in the same way as above and the gel percentages of the products are illustrated in FIG. 4, FIG. 5, and FIG. 6 (reference example).

EXAMPLE 2

Figure 7:
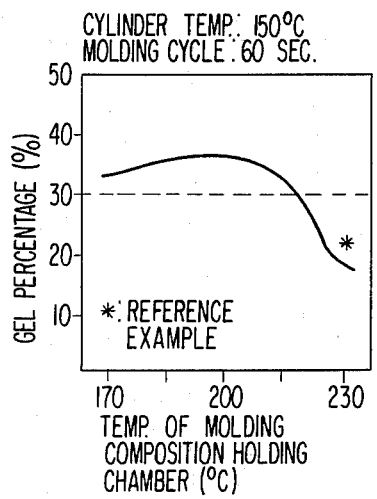
Figure 9:
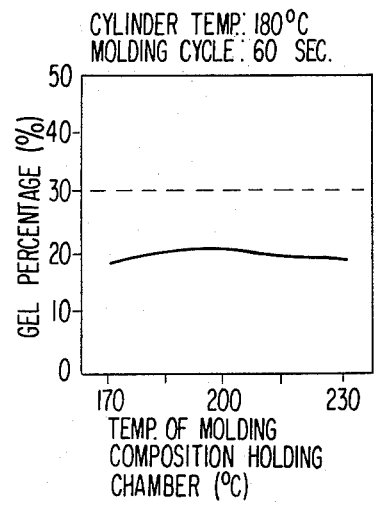

A mixture of 100 parts by weight of an ethylene-vinyl acetate copolymer (melt index, 20 dg/min; vinyl acetate content, 20% by weight), 5 parts by weight of azodicarbonamide as the foaming agent (decomposition temperature 150° C), 1.5 parts by weight of 1,1-di-t-butyl-peroxy-3,3,5-trimethylcyclohexane (one minute half-life temperature 150° C; purity 40%) as the cross-linking agent, 20 parts by weight of calcium carbonate as a filler, and 1 part by weight of zinc stearate as a foaming aid agent was kneaded on a 16 inch roll for 15 minutes at 75° C to provide a molding composition. The molding composition thus prepared was injected into a mold for shoe soles having a volume of 600 cc using the apparatus shown in FIG. 1 (the volume of the molding composition holding chamber was 300 cc and the inner diameter of the holding chamber was 40 mm) and a cross-linked, foamed molding having a gel percentage of more than 30% was obtained. The foaming ratio of the product was 2.0 – 2.2 times and almost the complete molding composition in the holding chamber was injected per one shot. The relationship between the molding conditions and the gel percentages of the moldings are shown in FIG. 7, FIG. 8, and FIG. 9 (reference example).

EXAMPLE 3

By injecting the molding composition of Example 1 using various mold volumes and the apparatus as shown in FIG. 1 or FIG. 2 having the various molding composition holding chambers as shown in Table 1, uniformly foamed, cross-linked moldings having a gel percentage of more than 30% were obtained using a one minute molding cycle.

The influence of the shape of the molding composition holding chamber and the molding conditions on the foaming state and the gel percentage of the moldings obtained are shown in Table 1 together with those of the reference example.

Pressing condition: After pre-heating, the sample was pressed for 10 minutes at 30 kg/cm$^2$ at the testing temperature Cooling condition: After pressing, the sample was cooled under a pressue of 30 kg/cm$^2$ for 5 minutes by means of a cold press 3. The results of measuring the gel percentages of various kinds of press cross-linked, foamed sheets are shown in FIG. 10 where numbers 1 to 4 correspond to Samples 1 to 4 described below.

TABLE 2

| Sample No. | Resin | Cross-linking Agent | Foaming Agent | Foaming Aid | Filler |
|---|---|---|---|---|---|
| 1 | Ethylene-vinyl acetate copolymer (melt index, 20 dg/min; vinyl acetate content, 20% by weight 100 parts | 1,3-bis(t-butyl-peroxy-isopropyl)benzene 0.6 part | Azodicarbonamide (decomposition temp. 200° C) 5 parts | Zinc stearate 2.0 parts | Calcium carbonate 20 parts |
| 2 | 100 parts " | " 0.6 part | 0 " | " 2.0 parts | " 20 parts |
| 3 | 100 parts " | 1,1-di-t-butyl-peroxy-3,3,5-trimetylcyclo-hexane 1.5 parts | Azodicarbonamide (decomposition) temp. 150° C) 5 parts " | Zinc stearate 1.0 part " | 20 parts " |
| 4 | 100 parts " | 1.5 parts | 0 | 1.0 part | 20 parts |

TABLE 1

| | One Minute Molding Cycle | | | | |
|---|---|---|---|---|---|
| Cross section of molding composition holding chamber | Circular | | | Annular | |
| Longest dimension of the cross section | (D) 40 mm | (D) 50 mm | (D) 60 mm | (R$_1$-R$_2$) = 30 mm (R$_2$ = 30 mm) | (R$_1$-R$_2$) = 40 mm (R$_2$ = 40 mm) |
| Volume of holding chamber (cc) | 300 | 450 | 700 | 450 | 700 |
| Mold volume (cc) | 600 | 900 | 1,400 | 900 | 1,400 |
| Temp. of cylinder (180° C) | foaming / cross-linking | foaming / cross-linking | foaming / cross-linking | foaming / cross-linking | foaming / cross-linking |
| temp. of molding composition 230° C | o / o | o / o | x / Δ* | o / o | x / Δ* |
| holding chamber 260° C | o / x | o / x* | o / x* | o / x* | o / x* |
| Temp. of cylinder (200° C) | | | | | |
| temp. of molding composition 230° C | 0 / o | o / o | x / Δ* | o / o | x / Δ* |
| holding chamber 260° C | o / x* | o / x* | o / x* | o / x* | o / x* |

In the above table, the foaming evaluation grades were as follows:
o: Uniformly foamed moldings were obtained.
x: Moldings having considerable unfoamed portions were obtained; and the cross-linking evaluation grades were as follows:
o: Gel percentage of more than 30%.
Δ: Gel percentage of 20 – 30%.
x: Gel percentage of lower than 20%.
*: Comparison example.
The foaming ratio of all moldings was about 2.0 – 2.2 times.

REFERENCE EXAMPLE

Press cross-linking foaming test:
1. Sample:
The test samples used in this test are shown in Table 2.
2. Conditions for the press cross-linking foaming test
Objective sheet: 160 mm × 160 mm × 1 mm
Pre-heating condition: Heated for 5 minutes at a contact pressure of 5 – 10 kg/cm$^2$ at the testing temperature While the invention has been described in detail and with reference to specific embodiments thereof, it will be apparent to one skilled in the art that various changes and modifications can be made therein without departing from the spirit and scope thereof.

What is claimed is:

1. A process for injection molding a cross-linked foamed ethylenic polymer article, which comprises plasticizing a molding composition comprising an ethylenic polymer, a cross-linking agent, and a foaming agent without substantially decomposing the cross-linking agent and the foaming agent, transporting said plasticized composition to a holding chamber, holding and heating said molding composition temperature and time sufficient to decompose the cross-linking agent and the foaming agent in said holding chamber while maintaining sufficient pressure on said composition to prevent foaming thereof and to thereby cross-link said ethylenic polymer to a gel percentage of less than about 40%, and then injecting said molding composition into a mold to form said article.

2. The process according to claim 1, wherein the temperature of said plasticizing is below the sum of the one minute half-life temperature of the cross-linking agent plus 20° C, and the temperature of holding is kept at a temperature above the temperature of the plasticization to the sum of the one minute half-life temperature of the cross-linking agent plus 70° C.

3. The process according to claim 1, wherein the molding composition is a mixture comprising 100 parts by weight of the ethylenic polymer, 0.05 – 30 parts by weight of the foaming agent and 0.05 – 10 parts by weight of the cross-linking agent.

4. The process according to claim 1, wherein the ethylenic polymer is a homopolymer of ethylene, a copolymer of ethylene and one or more comonomers, mixtures of two or more thereof or mixtures of two or more thereof and another polymer miscible therewith.

5. The process according to claim 4, wherein the copolymer of ethylene is an ethylene-vinyl acetate copolymer.

6. The process according to claim 1, wherein the cross-linking agent is 1,3-di-(t-butyl-peroxy-isopropyl)-benzene, benzoyl peroxide, dicumyl peroxide or 1,1-di-t-butyl-peroxy-3,3,5-trimethylcyclohexane.

7. The process according to claim 1, wherein the foaming agent is azodicarbonamide, p-toluenesulfonyl hydrazide, azobis-isobutyronitrile, or dinitrosopentamethylene tetramine.

8. The process according to claim 1, wherein the gel percentage of said molding composition after holding is greater than 30% but less than about 40%.

* * * * *